## 3,335,151
HIGHLY CHLORINATED NITROGEN HETEROCYCLIC COMPOUNDS AND PROCESS FOR PRODUCING THE SAME
Hans Holtschmidt and Horst Tarnow, Leverkusen, Germany, assignors to Farbenfabriken Bayer Aktiengesellschaft, Leverkusen, Germany, a corporation of Germany
No Drawing. Filed Nov. 1, 1965, Ser. No. 505,963
Claims priority, application Germany, Dec. 16, 1964, F 44,727
7 Claims. (Cl. 260—319.1)

It has now been found that highly chlorinated 5-membered or 6-membered nitrogen heterocyclic compounds can be obtained if aromatic isocyanide dichlorides or imide chlorides which contain a chlorine atom or a chloralkyl group in the o-position to the nitrogen are heated to 250 to 800° C. A large proportion of the starting materials are compounds of the general formula:

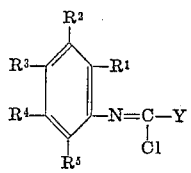

in which $R^1$ represents hydrogen, chloro and perchlorinated lower alkyl;

$R^2$ represents hydrogen, chloro, perchlorinated lower alkyl and

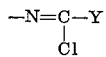

$R^3$ represents hydrogen, chloro, perchlorinated lower alkyl and

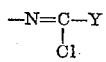

$R^4$ represents hydrogen, chloro, perchlorinated lower alkyl and

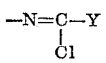

and $R^5$ represents hydrogen, chloro and perchlorinated lower alkyl, Y in each of

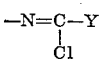

being selected from the group consisting of chloro and lower perchlorinated alkyl and at least one of $R^2$ and $R^5$ being other than hydrogen.

$R^1$–$R^5$ can form a condensed aromatic ring (preferably five and six membered) which itself can again carry the substituents $R^1$–$R^5$ and Y represents chlorine and a lower perchlorinated alkyl radical.

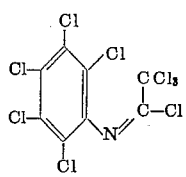

N-pentachlorophenyl-trichloromethyl imide chloride

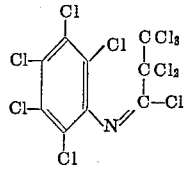

N-pentachlorophenyl-pentachloroethyl imide chloride

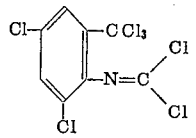

2,4-dichloro-6-trichloromethylphenylisocyanide dichloride

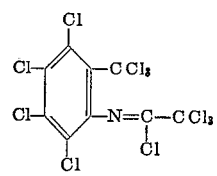

N-[2,3,4,5-tetrachloro-6-trichloromethylphenyl]-trichloromethyl imide chloride

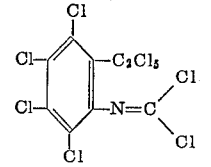

2,3,4,5-tetrachloro-6-pentachloroethylphenyl isocyanide dichloride

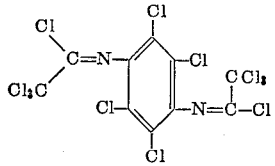

[2,3,5,6-tetrachlorophenylene-(1,4)]-bis-trichloromethyl imide chloride

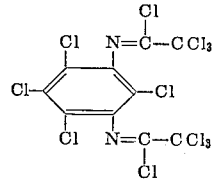

[2,4,5,6-tetrachlorophenylene-(1,3)]-bis-trichloromethyl imide chloride

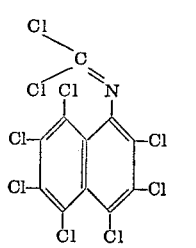

Heptachloronaphthyl-1-isocyanide dichloride

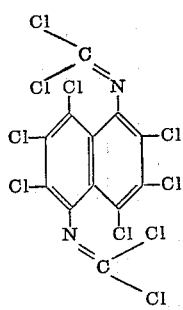

Hexachloronaphthylene-(1,5)-bis-isocyanide dichloride

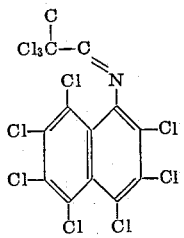

N-heptachloronaphthyl-trichloromethyl imide chloride

The heating, which causes a pyrolysis reaction, is carried out at temperatures from about 250 to about 800° C., advantageously 300 to 600° C., optionally in the presence of an inert organic solvent and optionally in an inert gas atmosphere. The starting material can be heated gradually up to reflux temperature or until chlorine is visibly split off. The reaction period is about 1–10 hours and advantageously 2–5 hours. However, the molten substance or the substance dissolved in an inert solvent, such as chloroform, carbon tetrachloride, dichlorobenzene, trichlorobenzene and others, can be exposed for a longer residence time in a heated tube. The residence time is for example 1–30 minutes. However, it is also possible to work with shorter residence times and for the product obtained to be again subjected to pyrolysis. In this way, the process can also be carried out continuously, it being possible for some of the reaction material to be conducted in a cycle. In every case, the use of an inert gas such as nitrogen or carbon dioxide is advantageous.

The process is explained by using, as an example, the pyrolysis of pentachlorophenyl trichloromethyl imide chloride.

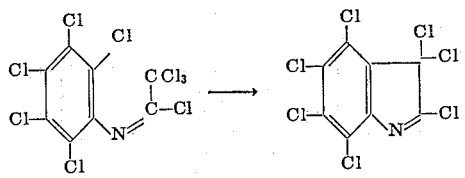

It is outstanding that readily accessible starting compounds can be transformed under simple conditions into highly chlorinated nitrogen heterocyclic compounds. It is surprising that the distinctly intramolecular reaction proceeds with chlorine being split off, without uncontrolled cracking reactions, and without intramolecular condensation reactions. A ring-closure reaction occurs with chlorine or perchloralkane being split off, the imide chlorides or isocyanide dichlorides changing into chlorine-containing nitrogen heterocyclic compounds.

The highly chlorinated nitrogen heterocyclic compounds which can be produced by the process according to the invention were not previously available or only available with difficulty by other methods. They are valuable products for the preparation of pest control agents, herbicides, dyestuffs and plastics.

The new compounds obtainable according to the invention are valuable intermediates for the production of pest-control agents, dyestuffs and plastics.

They have both herbicidal and insecticidal properties and accordingly they can also be directly employed. The highly chlorinated compounds have a particularly strong action against insects such as flies, ticks and cockroaches.

The heptachloroquinoline has a strong insecticidal action. Aqueous emulsions of different concentrations of heptachloroquinoline are prepared by dissolving it in dimethylformamide and diluting the solution with water and a non-ionic emulsifier to the required concentration. Even in a concentration of 0.01%, such emulsions destroy 100% flies, gnats and cockroaches.

The following examples illustrate the invention:

*Example 1*

430 parts by weight of pentachlorophenyl trichloromethylimide chloride were heated for 8 hours in a weak stream of nitrogen to 380–400° C.

Subsequent vacuum distillation produced 326 parts by weight of perchlorindolenine of the formula:

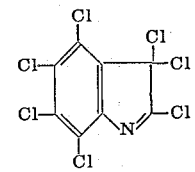

B.P.$_{0.2}$: 140–145° C., colourless crystals of M.P.: 122–124° C.

Analysis for $C_8Cl_7N$—Calculated: 69.31% of total chlorine. Found: 70.40% of total chlorine. Calculated: 29.70% saponifiable chlorine. Found: 29.80% saponifiable chlorine corresponding to 3 chlorine.

*Example 2*

256 parts by weight of pentachlorophenyl pentachloroethyl imide chloride were heated for 7 hours in a weak stream of nitrogen to 400° C. The residue which remained was recrystallised from Wash benzine. There were obtained 150 parts by weight of perchloroquinoline of the formula

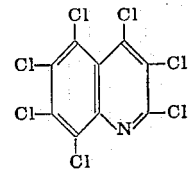

Colourless crystals of M.P. 150–152° C.

Analysis for $C_9Cl_7N$—Calculated: 67.07% chlorine. Found: 67.05% chlorine.

*Example 3*

180 parts by weight of 2,4-dichloro-6-trichloromethyl phenylisocyanide dichloride were dissolved in 100 parts by weight of carbon tetrachloride and dripped through a quartz tube with a length of 60 cm. and a diameter of 3 cm., filled with Raschig rings. The tube was situated in a vertical furnace and was heated to 450 to 500° C. The dark brown reaction product was distilled in vacuo. There were obtained 120 parts by weight of pentachloroindolenine of the formula

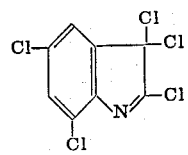

B.P.$_{0.1}$: 100–105° C., $n_D^{20}$: 1.6160.

Analysis for $C_8H_2Cl_5N$—Calculated: 61.31% chlorine. Found: 62.70% chlorine.

What we claim is:
1. Highly chlorinated nitrogen heterocyclic compounds of the formula

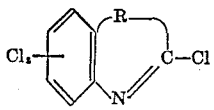

in which
R is defined as

and
z is a whole number of 1–4.

2. The compound of the formula

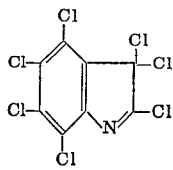

3. The compound of the formula

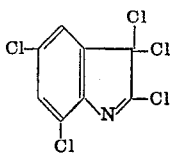

4. A process for the production of highly chlorinated nitrogen heterocyclic compounds which comprises heating to 250–800° C. a member selected from the group consisting of

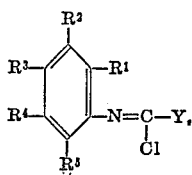 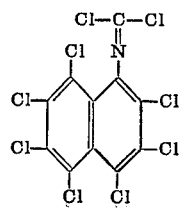

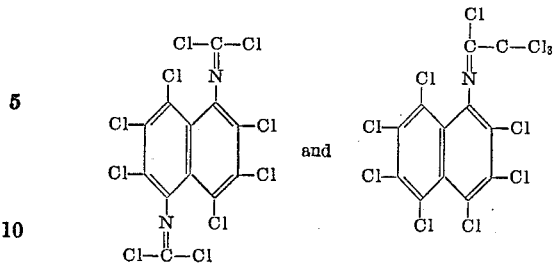

in which
R¹ is a member selected from the group consisting of hydrogen chloro and perchlorinated lower alkyl;
R² is a member selected from the group consisting of hydrogen, chloro, perchlorinated lower alkyl and

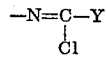

R³ is a member selected from the group consisting of hydrogen, chloro, perchlorinated lower alkyl and

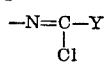

R⁴ is a member selected from the group consisting of hydrogen, chloro, perchlorinated lower alkyl and

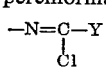

and
R⁵ is a member selected from the group consisting of hydrogen, chloro and perchlorinated lower alkyl,
Y in each of

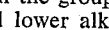

being selected from the group consisting of chlorine and perchlorinated lower alkyl and at least one of R¹ and R⁵ being other than hydrogen.

5. The process of claim 4 wherein the heating is carried out at a temperature of from 300–600° C.
6. The process of claim 4, wherein the heating is carried out in the presence of an inert organic solvent.
7. The process of claim 4, wherein the heating is carried out in the presence of an inert gas.

References Cited
UNITED STATES PATENTS 2,661,276  12/1953  Schlesinger _____ 260—283 XR
2,886,568  5/1959   Stransbury et al. _____ 260—283

OTHER REFERENCES

Holt Schmidt: Angerwandt Chemie, vol. 74, pp. 848–55 (November 1962).

ALEX MAZEL, *Primary Examiner.*

DONALD G. DAUS, *Assistant Examiner.*